United States Patent [19]

Detroit

[11] 4,384,997

[45] * May 24, 1983

[54] LIGNOSULFONATED DERIVATIVES FOR USE IN ENHANCED OIL RECOVERY

[75] Inventor: William J. Detroit, Schofield, Wis.

[73] Assignee: Reed Lignin, Inc., Greenwich, Conn.

[*] Notice: The portion of the term of this patent subsequent to Aug. 26, 1997, has been disclaimed.

[21] Appl. No.: 165,221

[22] Filed: Jul. 1, 1980

Related U.S. Application Data

[62] Division of Ser. No. 947,190, Sep. 29, 1978, abandoned.

[51] Int. Cl.³ .......................... C07G 1/00; E21B 43/22
[52] U.S. Cl. ................................ 260/124 R; 166/274; 252/8.55 D
[58] Field of Search .................. 252/8.55 D; 166/273, 166/274, 275; 260/124 R

[56] References Cited

U.S. PATENT DOCUMENTS

| | | | |
|---|---|---|---|
| 3,469,630 | 9/1969 | Hurd et al. | 166/250 |
| 3,726,850 | 4/1973 | Detroit | 260/124 |
| 3,841,887 | 10/1974 | Falkehag et al. | 260/124 |
| 4,006,779 | 2/1977 | Kalfoglou | 166/273 |
| 4,069,217 | 1/1978 | Detroit et al. | 260/124 |
| 4,088,640 | 5/1978 | Detroit | 260/124 R |
| 4,133,385 | 11/1979 | Kalfoglou | 252/8.55 X |
| 4,172,497 | 10/1979 | Kalfoglou | 166/273 |
| 4,219,471 | 8/1980 | Detroit | 260/124 |

*Primary Examiner*—Herbert B. Guynn
*Attorney, Agent, or Firm*—Douglas W. Wyatt; James W. Badie

[57] ABSTRACT

A composition useful in supplemental oil recovery from subterranean geological formations which composition includes a lignosulfonate that has been reacted with a halocarboxylic acid in an aqueous alkaline medium; and the process of introducing this composition into subterranean formations and reservoirs for the purpose of recovering additional petroleum therefrom.

8 Claims, No Drawings

LIGNOSULFONATED DERIVATIVES FOR USE IN ENHANCED OIL RECOVERY

This is a divisional application of application Ser. No. 947,190, filed Sept. 29, 1978, now abandoned.

BACKGROUND OF THE INVENTION

1. Field of Invention

This invention relates generally to supplemental oil recovery and is particularly related to compositions useful in supplemental oil recovery from subterranean geological formations. More specifically, the present invention is concerned with the aforementioned compositions which include lignosulfonates which have been reacted with halocarboxylic acids, and to a process of introducing such compositions into subterranean formations and reservoirs in order to increase petroleum recovery therefrom.

2. The Prior Art

Petroleum and natural gas are commonly recovered from subterranean geological formations or reservoirs by utilizing the pressure or energy inherent therein to force the petroleum (or natural gas) up to the earth's surface through wells bored into the formation. This method is generally referred to as a primary recovery method. It has been determined, however, that a major portion of the oil present in a formation is left unrecovered by this method.

Techniques to effect recovery of petroleum remaining in a formation when the natural forces for doing so are inadequate include water flooding through the injection wells drilled into the subterranean formation. This supplemental or secondary method also leaves significant amounts of petroleum unrecovered, however, due to the poor displacement efficiency of water and oil under the conditions prevailing in the reservoir with consequent high interfacial tension between the two fluids.

Surfactants, notably petroleum sulfonates, ethylene oxide adducts or alkyl phenols, alcohols and water soluble polyglycol ethers, and the like, have been used heretofore to reduce this interfacial tension and enhance the oil recovery possible with water-flooding techniques in a further supplemental or tertiary process.

It has also been proposed, heretofore, to introduce sacrificial agents or co-surfactants, such as lignosulfonate salts, into geological formations either as micellar dispersions including a primary surfactant and hydrocarbon, or in aqueous dispersion or solution preceding the water-flooding operation. Alcohols such as butanol, isopropanol and tertiary amyl alcohol, have been used as co-surfactants, but they are weak surfactants and relatively expensive. They serve principally as solubilizing agents for the primary surfactant and do little to reduce interfacial tension.

The sacrificial agent, whatever carrier means is employed, is characteristically injected into the subterranean reservoir through injection means in the form of an injection well penetrating the reservoir in spaced relation to a production means or well through which the crude oil or petroleum, ultimately displaced by the water-flooding fluid, is brought to the surface of the earth.

The secondary surfactant or sacrificial agent is one that will compete successfully, that is effectively or preferentially, with the primary surfactant for the active adsorption sites within the recovery zone of the formation, thus reducing the premature adsorption of the more expensive primary surfactant in the water-flooding fluid or micellar dispersion while being sufficiently inexpensive to warrant its use with no expectation of recovery.

While a variety of sacrificial agents such as the lignosulfonates or alkali metal carbonates, inorganic polyphosphates and the like have experienced an established utility heretofore, the need for further improvement is sustained by the increased variety and harshness of the environments in which primary and supplemental secondary, tertiary or ensuing step-wise oil recovery operations are undertaken. Thus, while expense and adsorptive capacity remains significant criteria, properties such as improved dispersancy, and particularly, salt tolerance and heat stability have an ever-increasing significance. Consequently, if a secondary surfactant and sacrificial agent could be developed that would incorporate the necessary properties of preferential adsorption in subterranean reservoirs while demonstrating significantly increased dispersant activity, salt tolerance and stability at the elevated temperatures frequently encountered by the increased depths at which recovery operations are now carried out without a material increase in the effective cost of the agent, a significant advance in the state of the art would be accomplished.

It is, therefore, an object of this invention to provide a novel sacrificial agent and secondary surfactant for use at a variety of stages in the petroleum recovery process that is inexpensive to produce and has a high preferential adsorptive capacity with respect to the primary surfactants employed in the petroleum recovery operation.

It is also an object of this invention to provide novel sacrificial agents characterized by increased dispersancy, salt tolerance and heat stability for use in petroleum recovery operations.

It is a further object of this invention to provide an improved method and apparatus for production of sacrificial agents and secondary surfactants for use in supplemental petroleum recovery from petroleum reservoirs.

The foregoing and other advantages of this invention will become more apparent from the ensuing detailed description.

SUMMARY OF THE INVENTION

In accordance with this invention, there has now been discovered, and this constitutes, in a general manner, the present invention, water-flooding fluids or liquids, including substantially aqueous media, and micellar dispersions for use in supplementary petroleum recovery operations incorporation of a lignosulfonate that has been reacted with a halocarboxylic acid, such as e.g., chloroacetic acid. The lignosulfonates which are suitable starting materials for reaction with halocarboxylic acids in the practice of this invention are the treated or untreated spent sulfite liquors (i.e., containing the desired effluent lignosulfonate solids) obtained from wood conversion as the sulfite waste pulp liquor, or ozonated lignosulfonates obtained from ozonation of the aforementioned spent sulfite liquors. In addition, although less preferrable, are the alkaline oxidized, hydrolyzed, partially desulfonated and subsequently resulfonated lignosulfonates.

The invention also encompasses the process of injecting the foregoing reaction products of lignosulfonates and halocarboxylic acids into an injection well penetrating a subterranean geological reservoir for the purpose of producing petroleum therefrom.

DETAILED DESCRIPTION OF THE INVENTION

In accordance with this invention, a sacrificial agent serving also as a secondary surfactant or co-surfactant in enhanced recovery of petroleum from a subterranean geological formation, is incorporated in aqueous or hydrocarbon medium or mixture, forming either an aqueous slug, a micellar dispersion or water-flooding composition.

The micellar dispersions for use in accordance with, and incorporating the carboxyalkylated lignosulfonate sacrificial agents of the invention include a liquid hydrocarbon, an aqueous medium, a primary surfactant and, optionally, an electrolyte.

Illustrative hydrocarbons for incorporation of these micellar dispersions are crude oil, crude column overheads, straight-run gasoline and liquified petroleum gases, kerosene, gasoline, and distillates.

Useful primary surfactants within the ambit of this invention include nonionic and anionic surface active compounds. Particularly useful primary surfactant compounds are the petroleum sulfonates.

The electrolytes incorporated optionally in the floodwater operation and micellar dispersions, include inorganic bases, inorganic acids and salts, and organic acids and salts, illustratively and preferably, sodium hydroxide, sodium sulfonate, hydrochloric acid, sulfuric acid, sodium chloride and polyphosphates well-known to those skilled in the art, and standard polyphosphates. The salts normally present in brackish water and brine provide useful electrolytes as well.

The term, "micellar dispersion" as employed herein is intended, generally, to include so-called "micro-emulsions" described by Schulman and Montagne, *Annals of the New York Academy of Sciences*, Vol. 92, pp. 366–371 (1961); "transparent emulsions", as recited in U.S. Pat. No. 2,356,206; oleopathic hydro-micelles, Hoar and Schulman, *Nature*, Vol. 152, page 102 (1943); and micellar solutions such as appear in U.S. Pat. Nos. 3,254,714; 3,275,075; 3,307,628 and 3,330,344; and as described, additionally, and by way of further illustration, in C. G. Summer, *Clayton's the Theory of Emulsions and Their Technical Treatment*, 5th Ed., pp. 315–320 (1954).

More particularly, micellar dispersions, in accordance with the invention, include from about 0.01 percent to about 20 percent by weight of carboxyalkylated lignosulfonate secondary or co-surfactant or sacrificial agent, and preferably from about 0.5 percent to about 5.0 percent thereof; 2 percent to 90 percent, by weight, of hydrocarbon; 5 percent to 95 percent of aqueous medium; at least 0.01 percent of primary surfactant up to about 0.5 percent to 5 percent thereof and, optionally, 0.001 percent to 5 percent by weight of electrolyte.

Where the carboxyalkylated lignosulfonate is alternatively or, in addition, incorporated, for example, in an aqueous slug prior to water-flooding or in the water-flooding fluid itself, the concentration of sacrificial agent will also be within the range recited hereinabove with respect to the concentration to be used in micellar dispersions; that is, from 0.01 percent to 20 percent, and preferably, about 0.5 percent to 5.0 percent by weight of the aqueous composition in which it is incorporated. The concentration of primary surfactant will be the same as that recited for the micellar dispersions as well.

The micellar dispersions and subsequently added aqueous slugs will include in addition, although optionally, corrosion inhibitors, bacteriacides and other conventional additives in concentrations well known in the art.

Flood-water used as a displacing fluid includes sodium chloride, calcium chloride, magnesium chloride, as well as, optionally, adsorbing viscosifiers and other standard additives and salts.

The concentration of sacrificial agent in the aqueous solution or hydrocarbon of the micellar dispersion is sufficiently high to satisfy the "saturation adsorption" value of the reservoir rock. Consequently, if a relatively high concentration is used, then a relatively small treatment volume is required to satisfy the active adsorption sites. If the sacrificial agent is injected in the micellar dispersion or in a sequentially injected aqueous slug, the use of a relatively concentrated solution of the agent is preferred, that is at least about 0.5 percent. If pre-treatment is not carried out prior to injection of the flood-water, but the sacrificial agent is only injected by incorporation therein, it is desirable that the leading edge at least of the flood-water also have a higher relative concentration of sacrificial agent, e.g., at least 0.5 percent. Behind the leading edge, the concentration can fall to reduced levels of 0.05 percent for an average desirably of at least 0.1 percent of the total flood-water composition. If, as preferred, the sacrificial agent is injected both in the micellar dispersion and, in addition, in the flood-water, or an intermediate aqueous slug, it is desirable that the pretreatment dispersion have a concentration in the range of 0.01, and more desirably, 0.1 percent to 20 percent, or normally, and preferably, as indicated, 0.5 to 5.0 percent. The upper limit of concentration of the sacrificial agent is determined by the solubility of the sacrificial agent and its compatibility with the components and additives of the micellar dispersion and displacing fluid in which it is incorporated.

The sacrificial agent or composition of the invention is thus injected into the subterranean petroleum reservoir in one or a combination of two or more of the foregoing steps or operations.

It is noted that the secondary surfactants and sacrificial agents of the invention are materially less expensive than the alcohols, e.g., tertiary amyl alcohol, referred to hereinabove, and unlike the alcohols, are more effective surfactants. Further, unlike the alcohols, the lignosulfonates derivatives of this invention manifest significant adsorptive properties in relation to the formations and reservoirs into which they are introduced.

The effect attained with successful utilization of the sacrificial agent in the specified concentrations is, as indicated hereinabove, that the adsorption sites in a portion of the displacement zone adjacent the injection well will be satisfied while leaving additional more remote portions of the displacement zone unsaturated with the sacrificial agent. This results in prolonging the usefulness of the primary surfactant introduced and its effectiveness in the more remote sectors of the displacement zone.

The preferred lignosulfonate starting materials which can be employed in the practice of this invention are the treated or untreated spent sulfite liquors (i.e., containing the desired effluent lignosulfonate solids) obtained from wood conversion as the sulfite waste pulp liquor. Many of these lignosulfonates are obtained in waste pulping liquors derived from totally, or at least substantially, softwood source, although some may also be derived from hardwood starting materials. These preferred lignosulfonates may be additionally sulfonated or sulfomethylated.

Other preferred lignosulfonate reactants are the ozonated lignosulfonates obtained from ozonation of the aforementioned treated or untreated spent sulfite liquors in the "as is" or whole liquor condition. Or, and oftentimes with advantage, they may be ozonated as a purified lignosulfonate material from or in which the sugars and other saccharide constituents have been removed and/or destroyed or, additionally, inorganic constituents have also been partially or fully eliminated. As a further alternative, though less preferable, the lignosulfonate material that is ozonated may be one of the desulfonated lignosulfonates (including substantially pure lignosulfonate compositions) which are generally obtained by catalytic—frequently alkaline—oxidation processes conducted under conditions of high temperature and pressure, oftentimes with accompanying hydrolysis.

Where alkaline oxidized, hydrolyzed, partially desulfonated lignosulfonates are utilized as the starting materials in practice of and to obtain the novel ozonated compositions of the present invention, they are usually most readily and conveniently obtained pursuant to the teaching of U.S. Pat. No. 2,491,832; and resulfonated prior to ozonization in the manner described in U.S. Pat. No. 4,060,217. These latter products are however less preferred in the practice described herein.

The addition and condensation products of the invention are secured by reaction of the foregoing lignosulfonates starting materials with:

(a) a halocarboxylic acid, and more particularly, a carboxylic acid of the formula, $M_p(C_nH_{2n})COOH$, wherein M is a bromine or, preferably, a chlorine atom; p has a value of 1 to 3, and preferably 1; and n has a value of 1 to 7 inclusive, for example, 5-chloro caproic acid, 3-bromobutyric acid, 2-chloro propionic acid, 4-bromacaprylic acid, trichloroacetic acid or preferably monochloroacetic acid; or indeed, the corresponding iodo- and fluro-acids.

(b) a halocarboxylic acid as characterized hereinabove; and sequentially, the derivative of a sugar acid-containing spent sulfite liquor derived from subjecting spent sulfite liquor to reaction with an alkali metal, and preferably sodium cyanide to form the cyanohydrin of the available reducing sugars present therein; followed by hydrolysis thereof; or (c) the foregoing derivative of said spent sulfite liquor.

The reaction of the lignosulfonates with a halocarboxylic acid is carried out in an aqueous alkaline medium having a pH preferably of at least 8. The alkaline medium is provided by an ammonium, alkali metal or alkaline earth metal base, or mixtures thereof, including, for example, carbonates, bicarbonates, or where appropriate in view of the cation employed, amines. Preferred are the hydroxides of the cations, sodium, lithium, potassium and calcium, as well as, but less desirably, strontium and barium. The reaction takes place at a temperature desirably of about 20° C. to about 110° C. and at ambient pressure for a period of about 2 to about 6 hours; and most desirably at a temperature of about 80° C. to 100° C. for about 5 hours. The parameters of time, temperature and pressure are not, however, narrowly critical.

As indicated hereinabove, novel and improved sacrificial agents or co-surfactants are also secured, as well, by reaction of the lignosulfonate starting materials or their halocarboxylic acid condensation reaction products with a spent sulfite liquor product formed by cyanohydrin reaction and hydrolysis of available reducing sugars; and more particularly by reaction of a cyanide in stoichiometric proportions calculated on the basis of glucose content for all of the reducing sugars present as in application of the classic Killiani-Fischer cyanohydrin synthesis. Where the foregoing cyanohydrin reaction is contemplated, the spent sulfite liquor is first modified by addition of reducing sugars in an amount sufficient to attain a concentration of reducing sugars therein of about 25 percent by weight.

Of this sugar content, 18 percent to 20 percent constitutes, preferably, pentoses and about 20 percent to 25 percent, hexoses. The reaction sequence further reflecting the application of the Killiani cyanohydrin synthesis, is completed by hydrolysis of the resulfonated cyanohydrin to the corresponding sugar acid. The result of this reaction is to introduce an additional carbon into each sugar molecule. Hence, there results a lignosulfonate, wherein the reducing sugar content totalling up to about 25 percent of the solids content thereof, is converted substantially to sugar acids totalling in excess of 25 percent, and up to about 32 percent by weight of the lignosulfonate solids content with the pentose and hexose content thereof being converted to corresponding concentrations by weight of the total sugar acid content, that is to about 18 percent to 20 percent of 6-membered sugar acids, and 20 percent to 25 percent of 7-membered sugar acids. Hydrolysis is effected conveniently by introducing the cyanohydrin into an aqueous alkaline solution having a pH of about 10 for a period of about 1 hour at a temperature of 70° C. to 80° C. at atmospheric pressure in accordance with the foregoing Killiani synthesis.

A lignosulfonate derived from reaction with a spent sulfite liquor resulting in turn from the cyanohydrin reaction sequence wherein this sulfite liquor product, designated hereinafter for convenience as KELIG 32, contains concentrations of 7-membered sugar acid well in excess of 20 percent, that is from 20 percent to 75 percent or more of the total sugar acid content present, provide highly desirable surfactants. These latter lignosulfonates are of particular utility when they have been subjected to reaction with halocarboxylic acid, particularly chloroacetic acid, which imparts a unique capability to the resulting composition for enhanced petroleum recovery.

Whether introduced into the resulfonated lignosulfonate unreacted with halocarboxylic acid or added to the acid condensation product mixture, the reaction goes to completion over a relatively abbreviated period of about 0.5 hour to about 1.5 hour and preferably about 0.5 hour, and is undertaken at ambient pressure, and a temperature in the range of about 50° C. to about 100° C., preferably from about 60° C. to about 90° C. Hydrolysis of the resulting cyanohydrin is readily effected by standard means.

The spent sulfite liquor employed in forming the reactant derivative for use herein is that secured from the standard hard acid sulfite pulping process using hardwood or softwood pulp. The spent sulfite liquor is preferably concentrated from a dilute content of about 14 percent solids as received from the digester to a concentration preferably of about 45 percent solids. This concentration is secured through evaporation in a conventional spent sulfite liquor evaporator, e.g., a standard Triple Effect Rosenblad evaporator.

Ozonated lignosulfonates also constitute the preferred lignosulfonate reactants in the practice of this invention. The ozonated compositions are readily obtained by the direct ozone oxidation, in alkaline media, of the referenced lignosulfonate starting materials described herein. Ordinarily and most conveniently, this is done with ozone (present either in oxygen or air) in an aqueous alkaline solution of the starting material, as more fully described in U.S. Pat. No. 4,088,640, issued to William J. Detroit on May 9, 1978, the disclosure of which is fully incorporated herein by reference.

Thus, the ozonated compositions are lignosulfonates that have been subjected to ozone oxidation in an aqueous alkaline medium and contain between about 2 and about 20 percent by weight of total added combined oxygen in the ozonized lignosulfonate. Moreover, the resulting ozonized compositions are substantially completely soluble in aqueous saline solutions and aqueous sulfuric acid solutions at pH ranges between about 1.5 and about 7.

The additionally sulfonated or sulfomethylated compositions, including the alkaline earth metal and alkali metal salt derivatives thereof, are readily obtained by the direct sulfonation or sulfoalkylation of the referenced alkaline, ozone oxidized, hydrolyzed lignosulfonate starting material. Ordinarily and most conveniently, this is done with appropriate sulfonating reagents in an aqueous solution of the starting material, advantageously using agitation during the reaction (which is better when applied vigorously and may be either by mechanical mixing or stirring and/or from the agitating effects of steam being passed into the reaction mass when steam is used for heating), at any desired suitable temperature. In general, the reaction can be conducted over a temperature range from about 50° C. to about 200° C., although it is ordinarily desirable to run at least at the boil (i.e., about 100° C. or so) in order to avoid unduly long reaction times. Ordinarily, a temperature on the order of 160° C. is satisfactory for effective resulfonation. Of course, the reaction is accomplished under corresponding pressure when temperatures over boiling are utilized. The time of reaction generally varies with the temperature involved; lower temperatures requiring longer times. At higher temperatures the resulfonation can be completed in as little as ½ hour or so while temperatures at the lower end of the scale may require as much as 16 or more hours for completion. When conducted at about 160° C., the resulfonation cooking is usually completed within about an hour.

Any suitable sulfonation reagents may be used for the resulfonation reaction. When straight sulfonation is desired, it is advantageously accomplished with an alkali metal (such as sodium) sulfite or sulfur dioxide. Sulfoalkylation is accomplished with mixtures of an appropriate lower alkyl aldehyde, RCHO, wherein R has a value of from 1 to 2 and a bisulfite. The sulfoalkylates, which ordinarily involve 1 to 3 carbon atom alkyl units, are of the structure $—(CH_2)_y—SO_3H$, wherein y is usually an integer from 1–3 and when y is plural the alkyl unit may be linear in attachment or, as is probably the most frequent case, comprised of side-chain arrangements. Sulfonation may be limited to introduction of the sulfonate group, per se, $—SO_3H$. Sulfonation, so defined, and sulfoalkylation are embraced herein by reference to attachment of groups of the formula—$(CH_2)_xSO_3$, wherein x has a value of 0 to 3 inclusive.

The foregoing aldehyde is utilized in approximately stoichiometric proportions with the bisulfite, $XHSO_3$, wherein X is an alkali metal or alkaline earth metal in the sulfoalkylation step. Obviously, if desired, mixed aldehyde reaction systems may be utilized even though there is ordinarily no particular advantage in this. Usually, it is most desirable to accomplish the resulfonation by sulfomethylation using formaldehyde ($CH_2O$) and sodium bisulfite ($NaHSO_3$) as reagents so as to make sulfomethyl ($—CH_2SO_3H$) attachments in the resulfonated product.

As indicated, about stoichiometric relative proportions of the aldehyde and bisulfite reagents are employed for the resulfonation; these being used in amounts calculated to effect the desired extent or quantity of sulfonic acid units in the finally obtained resulfonated product. Actually a plus or minus 20% tolerance from exactly stoichiometric ratios is tolerable. In sulfomethylating reactions, the amount of formaldehyde used may vary from about 1½ to about 12 wt.% of the desulfonated starting material being resulfonated while the bisulfite can correspondingly be utilized in quantities, on the same basis, of between about 5 and about 40 wt.%.

The additionally sulfonated or sulfamethylated products may as desired, contain anywhere from about 1¼ wt.% to 14–15 wt.% of total sulfur in combined organic sulfonic sulfonate form. Advantageously, the range of such sulfur is between about 2¾ and about 10 wt.%, and preferably from about 4½ to about 6½ wt.%.

Other lignosulfonates which may also be used in the practice of this invention, although less desirably, are the derivatives of an oxidized, partially desulfonated lignosulfonate obtained in the spent oxidized liquor from a dilute vanillin oxidized softwood, or although less desirably, hardwood, spent sulfite liquor by acidification prior to vanillin extraction with an organic solvent as described in U.S. Pat. No. 2,491,832; and, having assumed a relatively uniform molecular size are further treated with, for example, sodium bisulfite and an aldehyde, preferably formaldehyde, at elevated temperature, e.g. 160° C. and pressure (150 psi) to sulfoalkylate, and desirably, sulfomethylate, the desulfonated lignosulfonate molecules as described in U.S. Pat. No. 4,069,217.

Practice of the process of U.S. Pat. No. 2,491,832 yields a spent oxidized liquor containing partially desulfonated, generally acid-insoluble, chemically altered organic lignin substances. These are usually isolated, or alternatively, fractionated, by acid precipitation using most desirably sulfuric acid, which eliminates various sludge-producing mostly calcium-based, ingredients therein. After the precipitation, the purified partially desulfonated lignosulfonate material is generally dissolved in caustic to yield a sodium salt.

The partially desulfonated lignosulfonate material thus obtained is obviously not directly procurable from original spent sulfite liquors as are the so-called "lignosulfonates" (the "water:soluble" calcium or equivalent lignosulfonate salt or lignosulfonic acid described, for example, in U.S. Pat. No. 2,880,102). On the contrary, the partially desulfonated lignosulfonates when isolated by conventional means, such as acid precipitation or ultra-filtration, are exceptionally pure materials containing essentially no sugars or polysaccharides and having only vanishing traces, if any, of combined sulfur in sulfite form. Further, these lignosulfonates have relatively uniform and substantially constant relative molecular size characteristics, as well as other unique and distinguishing properties.

The alkaline oxidized, partially desulfonated lignosulfonates which are anionic polyelectrolytes with relative molecular sizes usually on the order of 1,000 to 20,000, and from which the resulfonated products employed as surfactants pursuant to instant practice are obtained, generally have an organic sulfonic sulfur, i.e.,—$SO_3$, content, calculated as percent sulfur by weight of broadly between about $\frac{1}{2}$ and about 5 wt.%. More advantageously for many purposes, this sulfur range is between about $1\frac{3}{4}$ and about $3\frac{1}{4}$ wt.%; while quite often it is preferable for the partially desulfonated lignosulfonate to contain from about 2.2 to about 2.8 wt.% of the combined sulfur in the sulfonic form.

"Relative molecular size" as this term is employed herein, is a term well-known to those skilled in the art to which this invention pertains. A method for determining relative molecular size is described by Julius Benko, in *Measurement of the Relative Molecular Weight of Lignosulfonates by Diffusion*, Preprint of paper read before the Section of Physical Chemistry, American Chemical Society, New York, N.Y., September 1960.

The foregoing method, as indicated, is a standard, well known and further elaborated upon in a brochure available, for example, from the Marathon Division of American Can Company, Rothchild, Wis.

The resulfonated lignosulfonates derived from the foregoing partially desulfonated lignosulfonates are, as indicated elsewhere herein, readily obtained by the direct sulfonation or sulfoalkylation of the referenced alkaline oxidized, hydrolyzed, partially desulfonated lignosulfonate starting material, as described in U.S. Pat. No. 4,069,217, issued to William J. Detroit et al on Jan. 17, 1978, the disclosure of which is fully incorporated herein by reference.

Thus, the alkalline oxidized, hydrolyzed, partially desulfonated and subsequently resulfonated lignosulfonate starting materials have substituted therein, as the resulfonation units, those of the formula —$(CH_2)_x$—$SO_3H$, wherein x has a numerical integral value of from 0 to 3; or the alkali metal salt derivatives thereof. These lignosulfonate starting materials contain between about 1.5 to about 15.0 weight percent of total sulfur in combined organic sulfonic sulfonate form, and said lignosulfonates prior to resulfonation have relative molecular size of substantially 1,000 to 20,000.

The amount of halocarboxylic acid used in the practice of this invention for reaction with the lignosulfonates depends, to a great extent, on the nature of the lignosulfonate material and the type of halocarboxylic acid which are used. Generally, and in the case of chloroacetic acid, this amount may vary from about 5 to about 30 wt.%, preferably from about 8 to about 15 wt.% of chloracoacatic acid.

Useful petroleum sulfonates are, illustratively as recited in U.S. Pat. No. 3,302,713, incorporated herein by reference, those mixtures thereof capable of effecting an interfacial tension down to 0.03 dyne per centimeter that are prepared by sulfonating at least a portion of the sulfonatable constituents that occur in the boiling range of 700° F. to 1100° F.; and that have an average molecular weight of 452 and 702. Petroleum sulfonates now available commercially are capable of reducing interfacial tension down to 0.001 dyne per centimeter and these too provide desirable primary surfactants for use herein.

Other petroleum sulfonates, useful in the practice of the present invention, are those mixtures thereof described in U.S. Pat. No. 3,468,377 and characterized by a median molecular weight of from about 375 to about 430, having molecular weights from 290 to 590, no more than 15 percent by weight thereof having an average molecular weight thereof having an average molecular weight greater than 590. Determination of molecular weight of petroleum sulfonates and the use of molecular weight distribution to characterize particular petroleum sulfonate mixtures are well known. The method for determination of molecular weight distribution of the petroleum sulfonates recited herein appears in the publication "*Estimation of Molecular Weight Distribution of Oil-Soluble Sulfonates*" by Feldman and Hill, available upon request from the Division of Petroleum Chemistry, American Chemical Society (an abstract of which was published in *Abstract of Papers Presented Before the 136th Meeting of the Division of Petroleum Chemistry*, American Chemical Society at the Atlantic City Meeting, Sept. 13-18, 1958).

The natural petroleum sulfonates are prepared by sulfonation of fractions from a crude oil or refining stream. The synthetic petroleum sulfonates are those prepared by sulfonation of alkyl aryl fractions synthesized in various chemical operations, such as the alkylation of benzene with propylene tetramer. The sulfonation reaction is essentially the same with the natural or synthetic petroleum sulfonates and is carried out using oleum, sulfur trioxide, chlorosulfonic acid or concentrated sulfuric acid. A further description of standard procedures for the production of petroleum sulfonates appears in the *Encyclopedia of Chemical Technology*, Kirk-Othmer, edited by Raymond E. Kirk and Donald F. Othmer, the Interscience Encyclopedia Inc., New York, N.Y. 10054, Vol. 13, pages 327-331.

The preferred petroleum sulfonates are employed in the form of their neutral salts, and, most desirably, the sodium salt, to avoid the corrosiveness inherent in the acid form. Where employed as salts other than sodium, the molecular weight of the form employed will correspond to the sodium form.

The foregoing petroleum sulfonates of U.S. Pat. No. 3,468,377 may be prepared by sulfonating a selected fraction of a petroleum stock or synthesized alkyl aryl stock, or they may be prepared by admixing, in proper proportions, commercially available petroleum sulfonates, natural or synthetic. As an example of the latter method, the petroleum sulfonates may be obtained by admixing commercially available higher molecular weight petroleum sulfonates with commercially available lower molecular weight petroleum sulfonates. More specifically, commercially available petroleum sulfonates in the sodium form having molecular weights as high as 590 and having a median molecular weight of from about 410 to about 450, can be admixed with commercially available petroleum sulfonates in the sodium form having molecular weights as low as 290 and having a median molecular weight of from about 340 to about 380. Illustrative of commercially available lower molecular weight petroleum sulfonates that may be used in the mixtures of U.S. Pat. No. 3,468,377 is Pyronate 50. Illustrative of commercially available higher molecular weight petroleum sulfonates that may be employed in the foregoing mixtures are Alconate 80, Petronate L, and Bryton 430. Pyronate 50 contains about 50 percent petroleum sulfonates. Alconate 80 contains about 80 percent petroleum sulfonates. Petronate L contains about 62 percent petroleum sulfonates. Bryton 430 contains about 62 percent petroleum sulfonates. These various petroleum sulfonates are themselves, without further modification, useful primary surfactants for use in the practice of the invention.

Tables I, II, III, and IV hereinbelow show the molecular weight distribution of the sodium salt of the petroleum sulfonates in Pyronate 50, Alconate 80, Petronate L, and Bryton 430. In these tables, the analysis is based on petroleum sulfonates only. The analysis can be converted to the percent by weight of the total composition simply by multiplying by the percent of the petroleum sulfonates in the commercial product as recited in the preceding paragraph. The percent shown for a given molecular weight represents the proportion of the petroleum sulfonates having molecular weights averaging about the given molecular weight. The percent shown for the portion of the petroleum sulfonates having the lowest molecular weight includes an accumulation of all petroleum sulfonates having a molecular weight less than this lowest molecular weight. Similarly, the highest molecular weight portion includes an accumulation of all petroleum sulfonates having a molecular weight more than this highest molecular weight.

Pyronate 50, Alconate 80, Petronate L and Pyronate TRS10-80 (appearing in Example 2 hereinafter) are available from the Witco Chemical Company, Sonneborn Division, 3334 Richmond Avenue, P.O. Box 22443, Houston, Tex. 77027. Bryton 430 is commercially available from Continental Oil Company or Bryton Chemical Company, No. 9, Rockefeller Plaza, New York, N.Y. 10020.

TABLE I

Molecular weight distribution of (sodium) petroleum sulfonates in Pyronate 50

| Molecular weight: | Petroleum sulfonates only (percent by weight) |
|---|---|
| 289 | 7.4 |
| 296 | 9.5 |
| 302 | 2.3 |
| 311 | 3.8 |
| 322 | 16.5 |
| 344 | 9.3 |
| 361 | 12.0 |
| 414 | 32.1 |
| 438 | 7.1 |

Average molecular weight, 360.
Median molecular weight, 346.

TABLE II

Molecular weight distribution of (sodium) petroleum sulfonates in Alconate 80

| Molecular weight: | Petroleum sulfonates only (percent by weight) |
|---|---|
| 373 | 6.5 |
| 400 | 3.1 |
| 404 | 15.4 |
| 413 | 10.0 |
| 420 | 18.9 |
| 433 | 13.3 |
| 437 | 16.1 |
| 459 | 3.8 |
| 587 | 12.9 |

Average molecular weight, 440.
Median molecular weight, 418.

TABLE III

Molecular weight distribution (sodium) petroleum sulfonates in Petronate L

| Molecular weight: | Petroleum sulfonates only (percent by weight) |
|---|---|
| 350 | 9.3 |
| 390 | 3.5 |
| 401 | 15.4 |
| 416 | 10.1 |
| 423 | 17.4 |
| 437 | 11.8 |
| 444 | 14.9 |
| 523 | 3.8 |
| 577 | 13.5 |

Average molecular weight, 440.
Median molecular weight, 421.

TABLE IV

Molecular weight distribution of (sodium) petroleum sulfonates in Bryton 430

| Molecular weight: | Petroleum sulfonates only (percent by weight) |
|---|---|
| 356 | 7.5 |
| 410 | 14.9 |
| 413 | 3.2 |
| 425 | 10.2 |
| 427 | 17.9 |
| 449 | 15.4 |
| 458 | 12.4 |
| 513 | 4.1 |
| 570 | 14.6 |

Average molecular weight, 450.
Median molecular weight, 427.

The preferred petroleum sulfonates are dissolved in water or in a hydrocarbon to prepare the flood-water fluid or, micellar dispersions, respectively for use in the practice of the invention. In some instances, the petroleum sulfonates do not truly dissolve in water. Rather, they may only disperse in the water. Although the petroleum sulfonates may only disperse in water, however, this does not preclude the use of the dispersion in the practice of the invention so long as it does not form a filter cake when injected into the subterranean formation.

The hydrocarbons employed as solvents for preparing hydrocarbonaceous micellar dispersions are those which are liquid at the temperature and pressure of the subterranean formation. Ordinarily, hydrocarbons which boil at atmospheric pressure within the range of from about 300° F. to about 1000° F. are preferred as solvents and in the micellar dispersions of the invention.

While the concentration of petroleum sulfonate utilized, whether in micellar dispersion or flood-water addition, is normally within the range by weight of 0.01 percent to 20 percent and preferably 0.5 percent to 5.0 percent, any finite concentration of the petroleum sulfonate can be employed and will assist in displacing oil within the subterranean formation.

Other primary surfactants useful in the practice of the invention, in addition to the foregoing petroleum sulfonates, are the ethylene oxide adducts of alkyl phenols described in U.S. Pat. No. 3,553,130 and incorporated by reference herein.

The ethylene oxide adducts are well known and readily available commercially. Ethylene oxide adducts of nonyl phenols with varying numbers of ethylene oxide units are available commercially under the trade name TRITON N from Rohm and Haas Company, Philadelphia, Pa., and under the trade name IGEPAL from GAF Corporation. Ethylene adducts of octyl phenols are also by Rohm and Haas under the trade name TRITON X. Sulfonated derivatives of these materials also provide primary surfactants.

The total quantity of sacrificial carboxymethylated lignosulfonates to be injected into a subterranean formation in accordance with the practice of the invention can, in addition, and as previously indicated, be any amount up to and including an amount sufficient to occupy substantially all of the active sites of the formation. The less sacrificial agent employed, the more primary surfactant that will be adsorbed by the active sites in the formation proximate to the injection well. Excess amounts of carboxymethylated lignosulfonates can also be used without detriment to the recovery operation. The appropriate amount will depend, in large measure, upon the character and extent of the geological subterranean formation to be swept.

The following examples, wherein, as in the remainder of this specification, all references to parts and percentages are by weight unless otherwise expressly indicated, are further illustrative of the invention.

EXAMPLE I

The lignosulfonate reactant employed in this example was NORLIG 91Z, an ozonated lignosulfonate obtainable from American Can Company. As usually available, NORLIG 91Z has the following typical analysis and physical characteristics.

| TYPICAL ANALYSIS (Moisture Free Basis) | |
|---|---|
| pH, 3% solution | 9.0 |
| $OCH_3$, % | 4.5 |
| CaO, % | 6.0 |
| Total Sulfur as S, % | 6.2 |
| Sulfonic Sulfur as S, % | 5.5 |
| Reducing Sugars, % | 0.5 |
| Sodium, % | 6.2 |
| PHYSICAL CHARACTERISTICS | | |

| Usual Form | Liquid or Spray Dried Powder | |
|---|---|---|
| Solids Content, % | 50 | 95 |
| Color | dark brown | brown |
| Specific Gravity | 1.250 | — |

298 grams of NORLIG 91Z (33.6% solids) and 10 grams of chloroacetic acid were charged to a reaction flask equipped with a mechanical agitator. The mechanically agitated system was then heated to 80° C. and the reaction was allowed to go to completion over a 6-hour period at 80° C. after which the reaction system was cooled to 25° C. The resulting chloroacetic acid treated ozonated lignosulfonate had a pH of 5.0 and was 50% solids. Its salt tolerance was 1.3% sludge in 264 g/l solution. At pH 7.25 (adjusted), the salt tolerance was equal to 1.0% sludge.

EXAMPLE II

The lignosulfonate reactant employed in this example was NORLIG 92, a purified sodium lignosulfonate, obtainable from American Can Company. As usually available, NORLIG 92 has the following properties:

| TYPICAL ANALYSIS (Moisture Free Basis) | |
|---|---|
| $OCH_3$, % | 8.56 |
| CaO, % | 0.5 |
| Total Sulfur as S, % | 7.58 |
| Sulfonic Sulfur as S, % | 6.13 |
| Reducing Sugars, % | 1.63 |
| Nitrogen, % | 0.82 |
| PHYSICAL CHARACTERISTICS | | |

| Usual Form | Liquid or Spray Dried Powder | |
|---|---|---|
| Solids Content, % | 50 | 95 |
| Color | Brown | Brown |
| Specific Gravity | 1.250 | — |

221 grams of NORLIG 92 (45.2% solids), 10 grams of chloroacetic acid and 23 grams of 50% NaOH were charges to a mechanically agitated vessel as in Example I and the reaction was allowed to proceed at 80° C. for 6 hours. The resulting product had a pH of 7.0 and was 35.4% solids. Its salt tolerance in 264 g/l of salt solution was equal to 0.6% sludge.

EXAMPLE III

The lignosulfonate reactant in this example was NORLIG X 91S, a sulfomethylated lignosulfonate, obtainable from American Can Company. As available, this material has the following properties:

| TYPICAL ANALYSIS (Moisture Free Basis) | |
|---|---|
| pH, 3% solution | 9.5 |
| $OCH_3$, % | 7.5 |
| CaO, % | 6.3 |
| Total Sulfur as S, % | 9.2 |
| Sulfonic Sulfur as S, % | 7.5 |
| Reducing Sugars, % | 0.5 |
| Sodium, % | 2.5 |
| PHYSICAL CHARACTERISTICS | | |

| Usual Form | Liquid or Spray Dried Powder | |
|---|---|---|
| Solids Content, % | 50 | 95 |
| Color | Dark Brown | Brown |
| Specific Gravity | 1.250 | — |

238 grams of NORLIG X 91S (42% solids), 10 grams of chloroacetic acid and 17 grams of 50% NaOH were allowed to react as in the previous example at 80° C., and the reaction was allowed to go to completion over a 6-hour period. The resulting product had a pH of 5.25 and was spray dried to a powder form containing 3% moisture. Its salt tolerance in 264 g/l salt solution was equal to 0.2% sludge.

The salt tolerances of the products obtained in the foregoing examples were determined as follows. Samples of these products were each tested at 5 percent (2.5 grams solids) and 1 percent (0.5 gram solids) concentrations in 50 ml of a 20 percent salt solution by introducing them into tared 60 ml jars which were shaken mechanically for 1 hour and then centrifuged on a De Laval centrifuge, and the percentage of the product recovered was determined in each case.

EXAMPLE IV

Broken-up or macerated Beria core and calcium bentonite were employed in a standard simulated test having relevance to enhanced supplemental petroleum recovery by placement thereof in reactor flasks including agitators which were activated upon introduction therein of an aqueous solution including 3% NaCl and 0.03% TRS 10-80, as a primary surfactant, Amoco 152 petroleum sulfonate (a crude product containing substantially six to twelve-member hydrocarbons); and as a co-surfactant and sacrificial agent of this invention, ozonated sodium salts of hardwood spent sulfite liquor identified as "ERA" which has been reacted with chloroacetic acid in accordance with this invention.

Formulations including alcohol co-surfactants and a control were also run without, however, including the co-surfactants of this invention.

The interfacial tensions of the solutions were measured as against nonane prior to the addition of the solutions to the test flasks and after one hour treatment therein.

The results are indicated in the following Table:

TABLE

| 0.3% TRS 10 –80 3% NaCl plus Cosurfactant as Listed | Interfacial Tension (Dynes/cm.) | | | | | |
|---|---|---|---|---|---|---|
| | Initial Interfacial Tension | Adsorption Studies | | | Thermal Stability | |
| | | Beria Core Treated 10 g. Beria/100 g. Solution | Ca Bentonite Treated | | | |
| | | | 10 g/100 g. Solution | 1 g/100 g. Solution | 150° C. | 200° C. |
| 0 Control | 0.08 | 6.28 | 11.96 | 8.89 | 0.34 | 0.42 |
| 1% Isopropanol | 0.09 | 7.63 | 11.17 | 6.66 | 1.14 | 2.20 |
| 1% n Butanol | 0.20 | 2.38 | 9.83 | 5.18 | 0.19 | 0.11 |
| 1% Tertiary Amyl Alcohol | 0.13 | 0.28 | 10.52 | 8.74 | 0.10 | 0.05 |
| 1% ERA-1[(1)] | 0.14 | 1.27 | 2.67 | 0.87 | 0.09 | 0.10 |
| 3% ERA-1 | 0.18 | 0.28 | 1.76 | 0.32 | 0.08 | — |
| 1% ERA-2[(2)] | 0.10 | 1.75 | 3.64 | 2.16 | 0.11 | 0.04 |
| 3% ERA-2 | 0.17 | 0.40 | 1.21 | 0.95 | 0.16 | — |
| 1% ERA-3[(3)] | 0.10 | 0.27 | 1.75 | 0.36 | | |

[(1)]NORLIG 92 CAA
[(2)]NORLIG 42 Z CAA
[(3)]Marasperse CR-23-6g Obtainable from American Can Company.

The products of this invention, as manifested by the foregoing test results, in the absence of experimental error, evidence the ability of the system of this invention to effectively lower interfacial tension through preferential adsorption on a Beria core or calcium montmorrillonite clay system of the halocarboxylated lignosulfonates of this invention.

Thus, it will be evident that the products of this invention exhibit excellent performance in facilitating lowering interfacial tension by the primary surfactants in the system in which they are both incorporated. They exhibit materially better performance in this regard than standard alcohol co-surfactants, and, indeed, they do so with a distinct cost/performance advantage when employed in micellar supplemental or tertiary oil recovery systems.

Additionally, the halocarboxylated lignosulfonates co-surfactants of this invention stabilize petroleum sulfonate systems to 200° C. as measured by lowering of interfacial tension. They are compatible with petroleum sulfonates, alcohols and polymer pusher fluids such as Dow 700 and Nalcos Visco Q41F.

Thus, the products of this invention compliment the petroleum sulfonate's activity to give a synergistic surfactant combination of high potential for micellar tertiary oil recovery systems.

It will be understood that the terms and expressions which have hereinbefore been employed are used as terms of description and not of limitation. The use of such terms and expressions is not intended to exclude equivalent features and expressions, or portions thereof, and it is recognized that various modifications are possible which are nevertheless within the scope of the present invention.

I claim:

1. A carboxyalkylated lignosulfonate made by reacting an ozonated lignosulfonate obtained by ozonation of lignosulfonate in an aqueous alkaline medium, at a temperature of from about 20° C. to about 110° C., for a period of at least about 30 minutes, with a halocarboxylic acid having the formula $M_p(C_nH_{2n})COOH$, wherein M is a halogen selected from the group consisting of chlorine, bromine, iodine and fluorine, p as an integer of 1 to 3 and n is an integer of 1 to 7.

2. A composition as in claim 1 wherein said halogen is chlorine.

3. A composition consisting essentially of a carboxyalkylated lignosulfonate made by reacting at a temperature of from about 20° C. to about 110° C., an alkaline oxidized, hydrolyzed, partially desulfonated and subsequently resulfonated lignosulfonate or an alkali metal salt derivative thereof with a halocarboxylic acid having the formula $M_p(C_nH_{2n})COOH$, wherein M is a halogen selected from the group consisting of chlorine, bromine, iodine and fluorine, p as an integer of 1 to 3 and n is an integer of 1 to 7, said resulfonated lignosulfonate containing between 1.5 to about 15 weight percent of total sulfur in combined organic sulfonic sulfonate form and said lignosulfonate prior to resulfonation having a relative molecular size of substantially 1,000 to 20,000.

4. A composition as in claim 3 wherein said halocarboxylic acid is chloroacatic acid.

5. A composition as in claim 3 having sulfonic sulfur present in said lignosulfonate in the form of units of the formula $-(CH_2)_x SO_3H$ wherein x has a numerical value of 0 to 3.

6. A composition as in claim 5 wherein said sulfonic sulfur is present as the sulfonic moiety of the formula $-SO_3H$.

7. A composition as in claim 5 wherein said sulfonic sulfur is present as sulfoalkyl group of the formula $(CH_2)_y SO_3H$, wherein y is an integer of from 1 to 3.

8. A composition as in claim 6, wherein said sulfonic sulfur is present as a sulfomethyl group of the formula $-CH_2SO_3H$.

* * * * *